United States Patent
Oh

(10) Patent No.: US 9,768,633 B2
(45) Date of Patent: Sep. 19, 2017

(54) EXTERNAL BATTERY AND DRIVING METHOD THEREOF

(71) Applicant: Samsung SDI Co., Ltd., Yongin-si, Gyeonggi-do (KR)

(72) Inventor: Seo-Taek Oh, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 176 days.

(21) Appl. No.: 14/228,113

(22) Filed: Mar. 27, 2014

(65) Prior Publication Data

US 2015/0042164 A1 Feb. 12, 2015

(30) Foreign Application Priority Data

Aug. 8, 2013 (KR) .................. 10-2013-0094045

(51) Int. Cl.
*H02J 7/00* (2006.01)

(52) U.S. Cl.
CPC ....... *H02J 7/0068* (2013.01); *H02J 2007/004* (2013.01); *H02J 2007/0037* (2013.01); *Y10T 307/25* (2015.04); *Y10T 307/461* (2015.04)

(58) Field of Classification Search
CPC .......... H02J 7/025; H02J 7/004; H02J 7/0021; H02J 7/0054
See application file for complete search history.

(56) References Cited

U.S. PATENT DOCUMENTS

| 2013/0193922 A1* | 8/2013 | Park | H02J 7/02 320/109 |
| 2015/0042164 A1* | 2/2015 | Oh | H02J 7/0068 307/38 |
| 2015/0198989 A1* | 7/2015 | Hayter | G06F 1/266 713/340 |

FOREIGN PATENT DOCUMENTS

KR 10-2008-0047004 A 5/2008
KR 10-2010-0009225 A 1/2010

* cited by examiner

*Primary Examiner* — Rexford Barnie
*Assistant Examiner* — Swarna N Chowdhuri
(74) *Attorney, Agent, or Firm* — Knobbe Martens Olson & Bear LLP

(57) ABSTRACT

An external battery and a driving method thereof are disclosed. In one aspect, the external battery includes a battery, a charging unit, a detecting unit and a main controller unit (MCU). The charging unit generates a charging current using external power supplied from an external charger to an input stage, and provides the charging current to the battery or to an external device. The detecting unit detects whether the external charger and the external device are both coupled to the external battery. The MCU controls the charging current to be provided to the external device, when the external charger and the external device are both coupled to the external battery. Accordingly, when the external charger and the external device are both coupled to the external battery, the external device can be directly charged using the charging current applied from the external charger.

17 Claims, 5 Drawing Sheets

EXTERNAL BATTERY AND DRIVING METHOD THEREOF

CROSS-REFERENCE TO RELATED APPLICATIONS

This application claims priority to and the benefit of Korean Patent Application No. 10-2013-0094045, filed on Aug. 8, 2013, in the Korean Intellectual Property Office, the entire contents of which are incorporated herein by reference in their entirety.

BACKGROUND

Field

The described technology generally relates to an external battery and a driving method thereof.

Description of the Related Technology

Recently, electronic devices such as notebook computers, cellular phones, PDAs and the like have been designed to be carried with users. These portable electronic devices frequently receive electric power supplied from rechargeable batteries. In addition to the unique functions provided by each portable electronic device, other capabilities can be added to the devices so that various additional functions can be performed using a single portable electronic device. Therefore, the electric power required for the use of portable electronic devices is increasing. Accordingly, larger capacity batteries may be required to operate the devices and maintain a quality time of use between recharges.

The battery capacity of a portable electronic device can be increased by using external batteries which are not included in the portable electronic device but can be carried with a user.

SUMMARY OF CERTAIN INVENTIVE ASPECTS

One inventive aspect is an external battery and a driving method thereof in which an external device coupled to the external battery can be charged first.

Another aspect is an external battery which directly charges an external device, using external power received from an external charger.

Another aspect is an external battery, including a battery, a charging unit configured to i) generate charging current using external power supplied from an external charger to an input stage, and ii) provide the charging current to the battery or an external device, a detecting unit configured to detect whether the external charger and the external device are both coupled to the external battery, and a main controller unit (MCU) configured to control the charging current to be provided to the external device when the external charger and the external device are both coupled to the external battery.

The detecting unit may include a first detecting unit configured to measure the voltage of the external power and a second detecting unit configured to measure current applied to the external device. The MCU may decide whether the external charger is coupled to the external battery using the measured voltage, and decide that the external device has been coupled to the external battery when the measured current is at least substantially equal to a predetermined reference current.

After controlling the charging current to be provided to the external device, the MCU may control the charging current to be provided to the battery when the measured current is less than the reference current.

After controlling the charging current to be provided to the battery, the MCU may control the charging current to be provided to the external device when the measured current is at least substantially equal to the reference current or when the measured current is at least substantially equal to the reference current for a predetermined reference period.

The external battery may further include an output stage configured to provide output current of the battery to the external device, a bypass circuit configured to enable the external charger and the external device to be coupled to each other, a first switching circuit disposed between the charging unit and the battery to electrically couple or decouple the charging unit and the battery and to electrically couple or decouple the charging unit and the bypass circuit; and a second switching circuit disposed between the output stage and the external device to electrically couple or decouple the output stage and the external device and to electrically couple or decouple the external device and the bypass circuit.

When it is determined that the external charger and the external device have been both coupled to the external battery, the MCU may control the first switching circuit so that the charging unit is decoupled from the battery and so that the charging unit is coupled to the bypass circuit, and control the second switching circuit so that the output stage is decoupled from the external device and so that the external device is coupled to the bypass circuit.

When the magnitude of the measured current is less than the reference current after the charging unit and the external device are coupled by the bypass circuit, the MCU may control the first switching circuit so that the charging unit is coupled to the battery and so that the charging unit is decoupled from the bypass, and control the second switching circuit so that the output stage is coupled to the external device and so that the external device is decoupled from the bypass circuit.

When the measured current is at least substantially equal to the reference current or at least substantially equal to the reference current for the predetermined reference period after the bypass circuit is decoupled, the MCU may control the first and second switching circuits so that the charging unit is coupled to the external device and so that the charging unit is decoupled from the battery and the output stage is decoupled from the external device.

The first switching circuit may be a three-terminal switch that selectively electrically connects the charging unit to the battery or the charging unit to the bypass circuit. The second switching circuit may be a three-terminal switch that selectively electrically connects the output stage to the external device or the external device to the bypass circuit.

Each of the first and second switching circuits may be implemented as one of: a solenoid switch, a trip coil and an insulated gate bipolar transistor (IGBT).

The MCU may control the charging current to be provided to the external device when the magnitude of the charging current is at least substantially equal to a predetermined reference charging current, and control the charging current to be provided to the battery when the magnitude of the charging current is less than the predetermined reference charging current.

The magnitude of the reference charging current may be about 2 Amperes.

Another aspect is a method of driving an external battery, the method including determining whether an external charger and an external device are both coupled to the external battery, and providing a charging current generated by external power supplied from the external charger to the external device when the external charger and the external device are both coupled to the external battery.

According to some embodiments, when an external charger and an external device are both coupled to the external battery, the external device can be directly charged using the charging current applied from the external charger.

DETAILED DESCRIPTION OF CERTAIN INVENTIVE EMBODIMENTS

Figure 1:
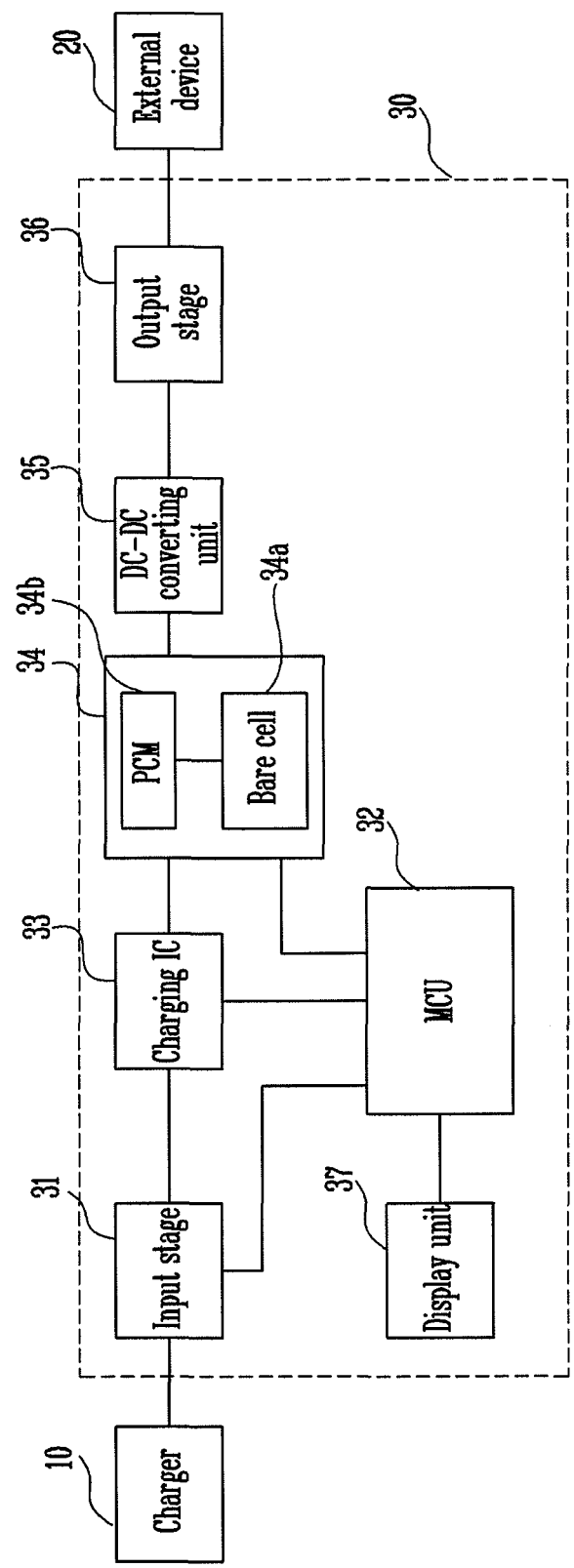
FIG. 1 is a block diagram schematically illustrating the configuration of an external battery.

Hereinafter, certain exemplary embodiments will be described with reference to the accompanying drawings. When a first element is described as being coupled to a second element, the first element may not necessarily be directly coupled to the second element but may be indirectly coupled to the second element via a third element. The term "coupled" as used herein includes the term "electrically coupled." Further, some of the elements that are not essential to the complete understanding of the described technology have been omitted for clarity. Also, like reference numerals refer to like elements throughout the specification.

In the drawings, the dimensions of elements may be exaggerated for clarity of illustration. It will be understood that when an element is referred to as being "between" two elements, it can be the only element between the two elements, or one or more intervening elements may also be present. Like reference numerals refer to like elements throughout the specification.

FIG. 1 is a block diagram schematically illustrating the configuration of an external battery.

Referring to FIG. 1, an input stage 31 of the external battery 30 receives external power supplied from an external charger 10. A main controller unit (MCU) 32 detects the type of the external charger 10 by measuring the voltage received at the input stage 31, and controls the output current of a charging IC 33. The charging IC 33 supplies the output current to a battery 34. The MCU 32 measures the voltage of the battery 34 and displays the measured voltage through a display unit 37.

A rechargeable secondary battery can be used as the battery 34 in the external battery. The secondary battery is typically formed by electrically coupling a bare cell 34a to a protection circuit module (PCM) 34b. Here, the bare cell 34a is formed by accommodating an electrode assembly and an electrolyte in a can and hermetically sealing the can. The PCM 34b typically performs the function of protecting the bare cell 34a by preventing overcharge, overdischarge, overdischarge current, etc., while controlling the charging and discharging of the bare cell 34a.

In the case where an external device 20 is coupled to the external battery 30, the voltage output from the battery 34 is typically boosted through a direct current to direct current (DC-DC) converting unit 35 to be supplied to the external device 20 through an output stage 36.

Generally, an external battery 30 uses a method in which, when an actual user couples both the external charger 10 and the external device 20 to the external battery 30, first, the battery 34 built in the external battery 30 is charged, and then, the voltage output from the battery 34 is output to the external device 20 to charge the external device 20. However, this method does not satisfy the user's requirement that the external device 20 be charged first.

When the battery of an external device is quickly discharged or when there is no time to charge the battery, the user of the external device frequently uses an external battery. Furthermore, when coupling the external device to the external battery while charging the external battery, the user may wish to charge the external device before the external battery is charged.

Thus, the described technology provides an external battery and a driving method thereof, in which when an external charger and an external device are both connected to the external battery, the power supplied from the external charger is first supplied to the external device, so that it is possible to satisfy the user's requirement that the external device be charged first.

Figure 2:
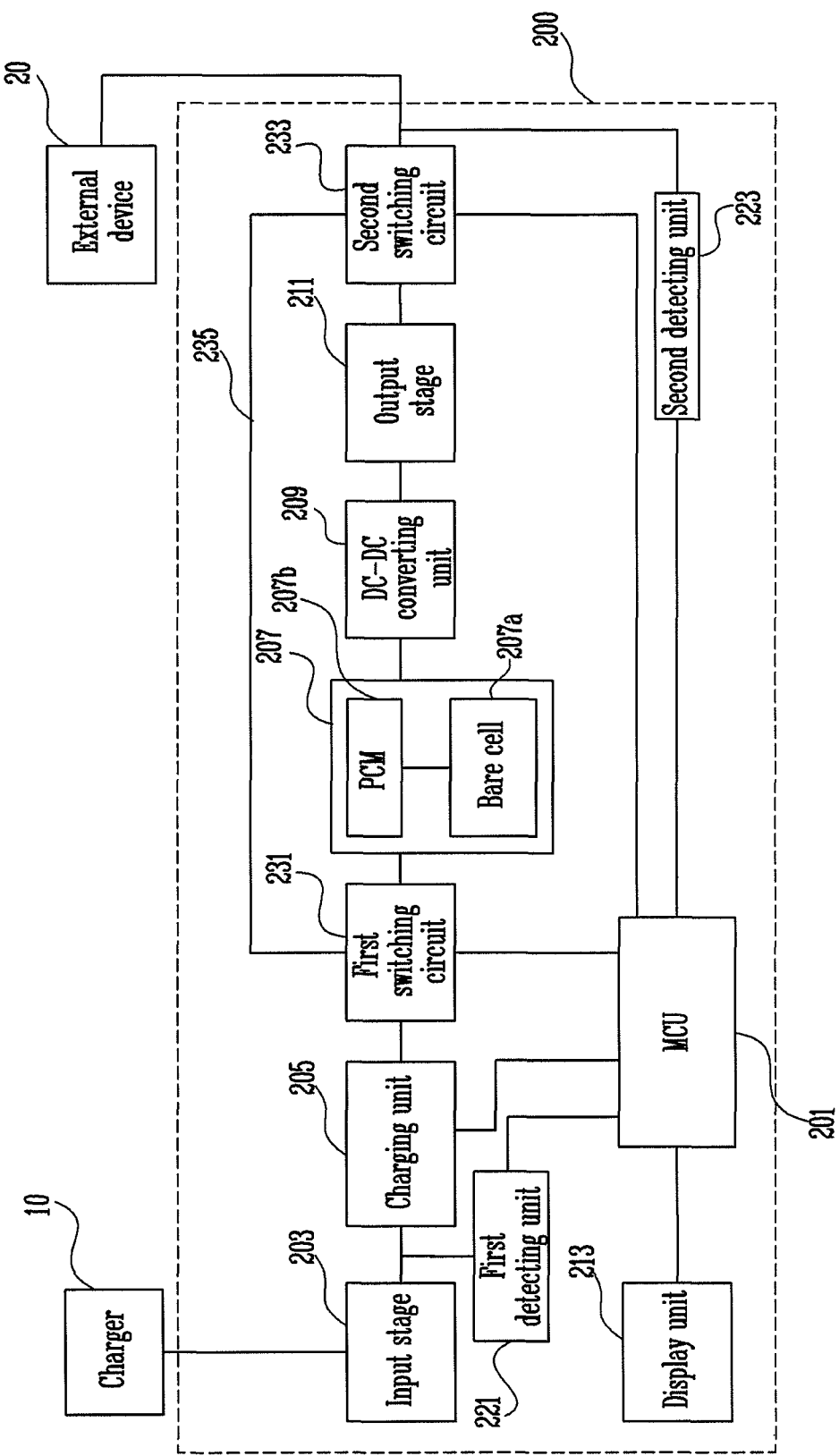
FIG. 2 is a block diagram of an external battery according to an embodiment of the described technology.

FIG. 2 is a block diagram of an external battery according to an embodiment.

Referring to FIG. 2, the external battery 200 may include a main controller unit (MCU or a controller) 201, an input stage (or an input unit) 203, a charging unit (or a charging circuit) 205, a battery 207, a direct current to direct current (DC-DC) converting unit (or DC-DC converter) 209, an output stage (or an output unit) 211, a first detecting unit (or first detector) 221, and a second detecting unit (or second detector) 223.

The MCU 201 generally controls the components of the external battery 200. In the case where an external charger 10 and an external device 20 are both coupled to the external battery 200, the MCU 201 controls the external battery 200 so that the external device 20 is charged first. Hereinafter, the operating principles of the MCU 201 together with other components will be described in detail.

The input stage 203 can be coupled to a terminal of the external charger 10, and can provide external power supplied from the external charger 10 to the charging unit 205. The input stage 201 may be implemented in various forms according to type of the external charger 10.

The charging unit 205 generates a charging current using the external power supplied from the input stage 203 and then supplies the generated charging current to either the battery 207, so that the battery 207 can be charged, or to the external device 20, so that the external device 20 can be charged. The magnitude of the charging current output from the charging unit 205 may be modified depending on the specifications of the external charger 10. Thus, the MCU 201 can detect the specifications of the external charger 10 by measuring the voltage applied to the input stage 203, and control the charging unit 205 so that the charging current can be modified according to the specifications of the external charger 10 and output from the charging unit 205.

The battery 207 may include a bare cell 207a and a protection circuit module (PCM) 207b electrically coupled to the bare cell 207a.

The bare cell 207a is a rechargeable battery cell in which an electrode assembly including a positive electrode, a separator, and a negative electrode is sealed inside a battery case together with a lithium electrolyte so that the electrode assembly is immersed in the lithium electrolyte. The electrode assembly can be formed into a jelly-roll structure (wound type) or a stacked structure (stacked type). In the jelly-roll structure, long sheet-shaped positive and negative electrodes each having an active material coated on both surfaces thereof are wound with a separator interposed between the positive and negative electrodes. In a stacked structure, a plurality of positive and negative electrodes each having an active material coated on both surfaces thereof are sequentially stacked with a separator interposed between the positive and negative electrodes.

The bare cell 207a may include a cylindrical bare cell, a prismatic bare cell, or a pouch type bare cell according to shape of the bare cell. In the cylindrical or prismatic bare cell, an electrode assembly is built in a metal can which functions as a battery case. In the pouch type bare cell, an electrode assembly is built in a battery case formed with an aluminum laminate sheet. The bare cell 207a may have a structure in which two or more bare cells are coupled in series and/or in parallel.

The PCM 207b is electrically coupled to the bare cell 207a and protects the bare cell 207a by controlling the overcharge voltage, overdischarge voltage, and discharge overcurrent of the bare cell 207a. The PCM 207b is not a main component of the described technology, and therefore, a detailed description thereof will be omitted.

The DC-DC converting unit 209 converts the voltage output from the battery 207 into a voltage with a magnitude for charging the external device 20, and provides the converted voltage to the output stage 211.

In some embodiments, the output stage 211 is coupled to the external device 20, to provide electric power supplied from the battery 207 to the external device 20. The output stage 211 may be implemented in various forms according to type of the external device 20.

Here, the external device 200 may be a device which is driven with a built-in battery, such as a PDA, a cellular phone, a smart phone or a notebook computer. The external device 20 may be one of various types of devices which are driven by receiving electric power supplied from the external battery or charge a battery included in the external device 20 using electric power received from the external battery. Hereinafter, for convenience of description, the charging of the external device 20 will be referred to as charging a battery built into the external device 20.

A display unit 213 which displays the capacity of the battery 207 can be provided. The MCU 201 may control the display unit 213 based on the voltage of the battery 207.

The first detecting unit 221 measures the voltage received at the input stage 203. The MCU 201 may determine whether the external charger 10 is coupled to the external battery 200 based on the voltage measured by the first detecting unit 221. The MCU 203 can determine the specifications of the external charger 10 based on the voltage received at the input stage 203, and controls the charging unit 205 so that the charging current is output from the charging unit 205 according to the specifications of the external charger 10.

The second detecting unit 223 measures a second current supplied from the external battery 200 to the external device 20. The MCU 201 may determine that the external device 20 is coupled to the external battery 200 when the current measured by the second detecting unit 223 is at least substantially equal to a predetermined reference current. Here, the reference current is a reference value at which it can be determined that the external device 20 is being charged through the external battery 200.

The external battery 200 may include a bypass circuit 235, a first switching circuit 231 and a second switching circuit 233. The bypass circuit 235 enables the charging unit 205 and the external device 20 to be electrically coupled to each other. The first switching circuit 231 is disposed between the charging unit 205 and the battery 207 to couple or decouple the charging unit 205 and the battery 207 and to couple or decouple the charging unit 205 and the bypass circuit 235. The second switching circuit 233 is disposed between the output stage 211 and the external device 20 to couple or decouple the output stage 211 and the external device 20 and to couple or decouple the external device 20 and the bypass circuit 235.

According to an embodiment, in the case where it is determined that the external charger 10 and the external device 20 are both coupled to the external battery 200, the MCU 201 may control the charging current generated in the charging unit 205 to be directly provided to the external device 20, bypassing the battery 207, the DC-DC converting unit 209 and the output stage 211.

To this end, the MCU 201 controls the first switching circuit 231 so that the charging unit 205 is decoupled from the battery 207 and coupled to the bypass circuit 235. The MCU 201 controls the second switching circuit 233 so that the external device 20 is decoupled from the output stage 211 and coupled to the bypass circuit 235.

As such, the charging current output from the charging unit 205 is directly provided to the external device 20 through the bypass circuit 235, so that the external device 20 can be charged prior to the battery 207.

The external device 20 can automatically stop charging when the external device 20 is fully charged. Accordingly, the magnitude of the charging current supplied from the external battery 200 to the external device 20 is decreased.

Thus, when the second detecting unit 223 measures the current to be less than the reference current after the charging unit 205 has been directly coupled to the external device 20, the MCU 201 performs charging of the battery 207 by controlling the charging current to be provided to the battery 207 instead of the external device 20. In this case, the external device 20 may be coupled to the output stage 211.

To this end, the MCU 201 controls the first switching circuit 231 so that the charging unit 205 and the battery 207 are coupled to each other and so that the charging unit 205 is decoupled from the bypass circuit 235. The MCU 201 also controls the second switching circuit 233 so that the output stage 211 and the external device 20 are coupled to each other and so that the external device 20 is decoupled from the bypass circuit 235.

According to an embodiment, in the case where a user uses the external device 20 after the external device 20 has been fully charged, the external device 20 starts to discharge. If the external device 20 is discharged to less than a predetermined level, the external battery 200 attempts to charge the external device 20 again.

In this case, the MCU 201 recognizes that the charging of the external device 20 has been attempted when the second detecting unit 223 measures a current at least substantially equal to the reference current, and controls the charging current to be directly provided to the external device 20.

According to another embodiment, in the case where the second detecting unit 223 measures a current at least substantially equal to the reference current for a predetermined reference period, the MCU 201 may control the charging current to be directly provided to the external device 20.

For example, the external device 20 may periodically attempt charging even though the external device 20 is fully charged. Since the external device 20 is fully charged, the charging of the external device 20 is immediately stopped after the external device 20 attempts to perform charging.

In this case, the MCU 201 necessarily repeats the operation of applying the charging current to either the battery 207 or the external device 20. As a result, the stability of a system may be lowered. Accordingly, in some embodiments, the battery of the external device 20 is charged using the charging current supplied from the battery 207 during the predetermined reference period, so that it is possible to prevent the charging current from being frequently provided to the external device 20 when it is fully charged. Here, the predetermined reference period may be set longer than the period when the fully-charged external device 20 attempts to perform charging.

According to yet another embodiment, in the case where the magnitude of the charging current output from the charging unit 205 is at least substantially equal to a predetermined reference charging current, the MCU 201 controls the charging current to be directly provided to the external device 20.

For example, the magnitude of the charging current output from the charging unit 205 may has various values such as about 500 mA, about 1 A or about 2 Amperes according to the specifications of the external charger 10. In the case where the magnitude of the charging current is less than the reference charging current, it takes a long time to charge the external device, and accordingly, the battery 207 of the external battery 200 may not be charged.

In order to solve such a problem, the MCU 201 controls the charging unit 205 and the external device 20 to be directly coupled to each other only when the charging current is at least substantially equal to the reference charging current, e.g., when the magnitude of the charging current is at least substantially equal to about 2 Amperes, so that the battery of the external device 20 can be charged at a high speed.

According to an embodiment, the magnitude of the reference charging current may be about 2 Amperes. This is because it is expected that the external device 20 can be charged at a high speed when the magnitude of the charging current is at least about 2 Amperes. In the case where the charging current is less than the reference charging current, the MCU 201 controls the first switching circuit 231 so that the charging unit 205 and the battery 207 are coupled to each other and so that the charging unit 205 is decoupled from the bypass circuit 235. The MCU 201 also controls the output stage 211 to be decoupled from the external device 20, so that the charging of the battery 207 is performed first.

Figure 3:
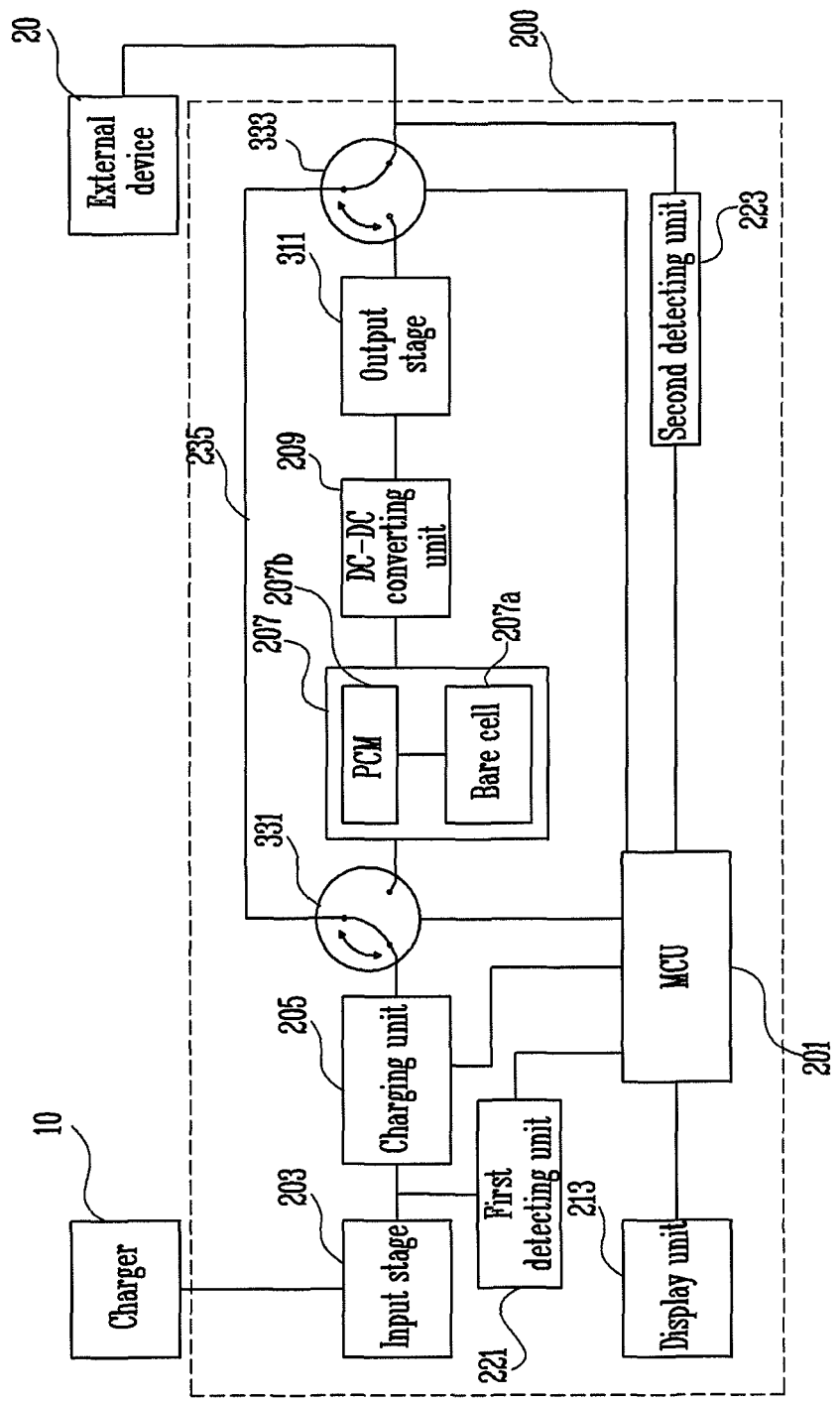
FIG. 3 is a block diagram illustrating a method of directly coupling an external charger and an external device.
Figure 4:
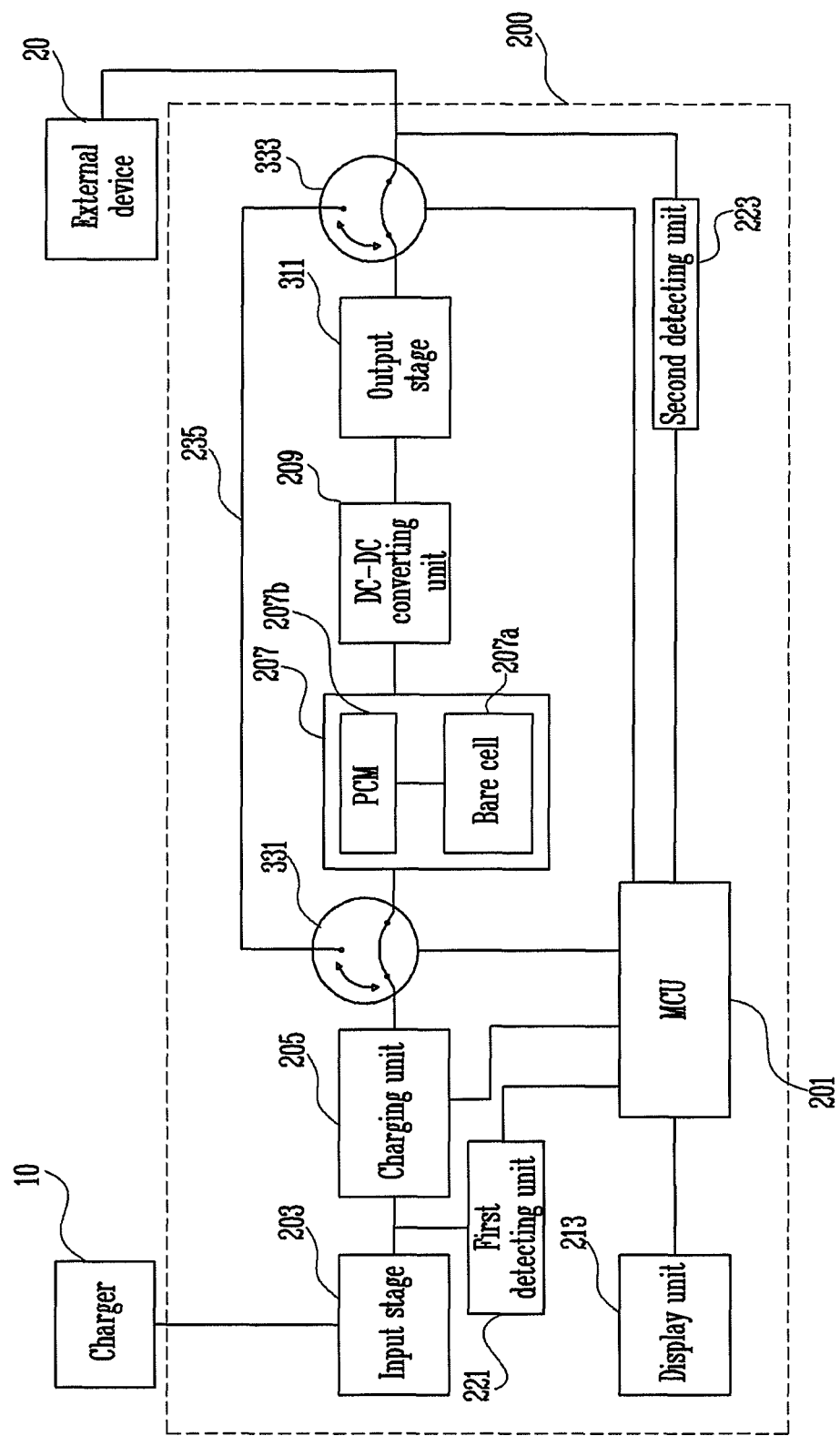
FIG. 4 is a block diagram illustrating a method of coupling the external charger and a battery of the external battery according to an embodiment.

FIG. 3 is a block diagram illustrating a method of directly coupling the external charger to the external device. FIG. 4 is a block diagram illustrating a method of coupling the external charger to the battery of the external battery according to an embodiment. Hereinafter, an embodiment of the switching circuit will be described with reference to FIGS. 3 and 4. Here, components identical or corresponding to those of the previous embodiment are designated by like reference numerals, and their detailed descriptions will be omitted.

As shown in FIGS. 3 and 4, first and second switching circuits 331 and 333 are preferably implemented as three-terminal switches. That is, the first switching circuit 331 selectively performs switching between the charging unit 205 and the bypass circuit 235 and between the charging unit 205 and the battery 207 under the control of the MCU 201. The second switching circuit 333 selectively performs switching between the bypass circuit 235 and the external device 20 and between the output stage 311 and the external device 20 under the control of the MCU 201. Meanwhile, in this embodiment, the first and second switching circuits 331 and 333 have been illustrated using components for illustrating the minimum functionality thereof, and may be implemented using various switching circuits including the functionality of this embodiment. For example, the switching circuits 331 and 333 may be implemented as various kinds of switches such as a solenoid switch, a trip coil or an insulated gate bipolar transistor (IGBT).

FIG. 3 shows the state in which the external charger 10 and the external device 20 are both coupled to the external battery 200. The MCU 201 recognizing this state controls the first switching circuit 331 so that the charging unit 205 is decoupled from the battery 207 and so that the charging unit 205 is coupled to the bypass circuit 235. The MCU 201 controls the second switching circuit 333 so that the output stage 311 is decoupled from the external device 20 and so that the external device 20 is coupled to the bypass circuit 235.

FIG. 4 shows the state in which the external device 20 is fully charged so that the charging of the external device 20 is stopped. The MCU 201 recognizing this state controls the first switching circuit 331 so that the charging unit 205 is coupled to the battery 207 and so that the charging unit 205 is decoupled from the bypass circuit 235. The MCU 201 controls the second switching circuit 333 so that the output stage 311 is coupled to the external device 20 and so that the external device 20 is decoupled from the bypass circuit 235.

Figure 5:
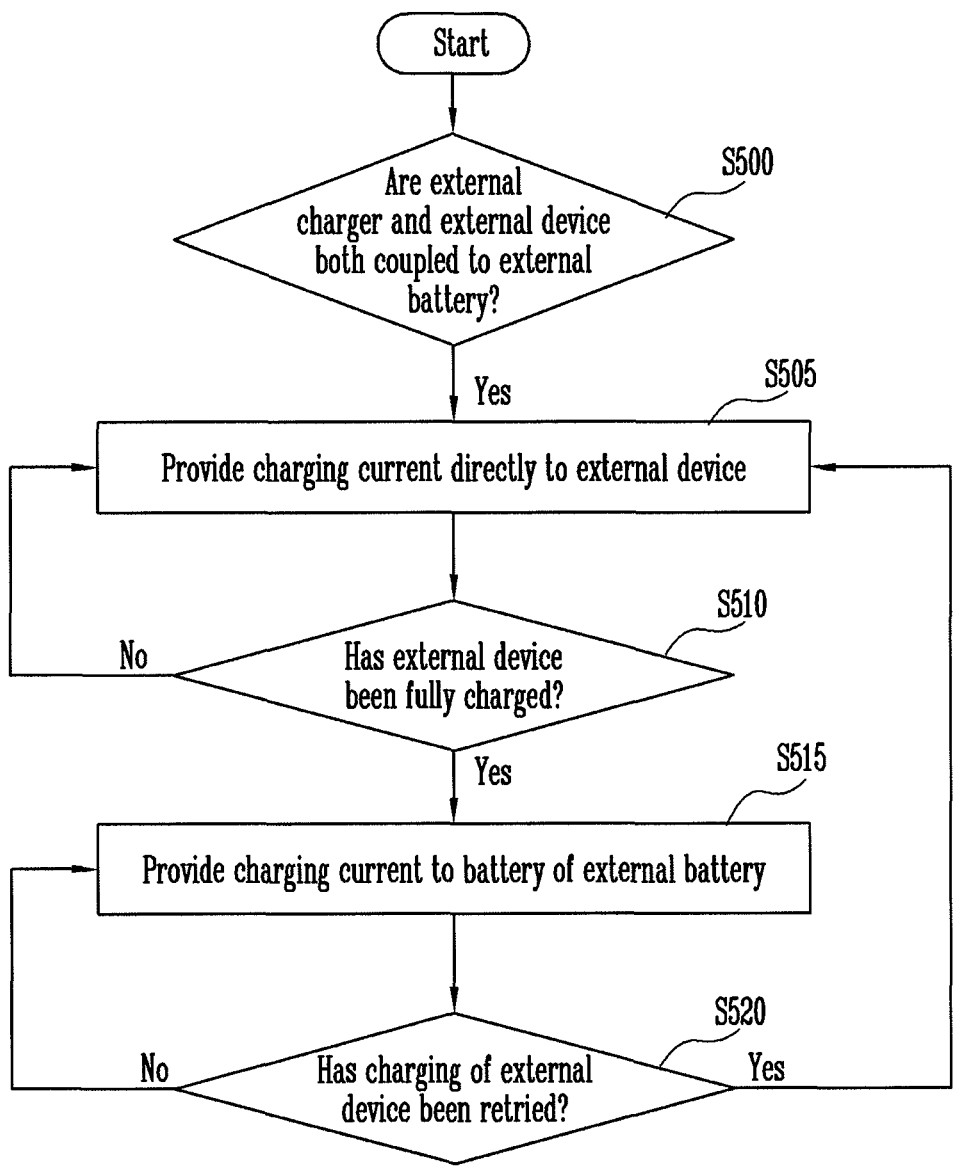
FIG. 5 is a flowchart illustrating a method of driving the external battery according to an embodiment.

FIG. 5 is a flowchart illustrating a method of driving the external battery according to an embodiment. Depending on the embodiment, additional states may be added, two or more states combined into one state, certain states removed, or the order of the states changes in FIG. 5.

Referring to FIG. 5, the method of driving the external battery may include the following steps. First, it is determined whether the external charger 10 and the external device 20 are both coupled to the external battery 200 (S500). The determination may include measuring the voltage at the input stage of the external battery, and measuring the current applied from the external battery to the external device. It may be determined that the external charger is coupled to the external device using the measured current, and that the external device is coupled to the external battery when the current applied to the external device is at least substantially equal to the predetermined reference current.

In the case where the external charger 10 and the external device 20 are both coupled to the external battery 200, the MCU 201 controls the charging current generated by power supplied from the external charger 10 to be directly provided to the external device 20 (S505).

Subsequently, it is determined whether the external device 20 is fully charged (S510). In the case where the external device 20 is fully charged, the charging of the external device 20 is stopped, and therefore, the magnitude of current applied from the external battery 200 to the external device 20 is decreased. Thus, in the case where the current applied to the external device 20 is less than the reference current, the external battery 200 can determine that the external device 20 has been fully charged.

In the case where it is determined that the battery of the external device 20 has been fully charged, the MCU 201 provides the charging current to the battery 207 of the external battery 200, thereby performing charging of the external battery 200 (S515).

Finally, in the case where it is determined that the external device 20 has attempted to recharge as the current applied to the external device 20 is increased to be at least substantially equal to the reference current (S520), the MCU 201 controls the charging current to be directly provided to the external device 20 (S505).

Exemplary embodiments have been described herein, and although specific terms have been employed, they are used and are to be interpreted in a generic and descriptive sense only and not for the purpose of limitation. In some instances, as would be apparent to one of ordinary skill in the art as of the filing of the present application, features, characteristics, and/or elements described in connection with a particular embodiment may be used independently or in combination with features, characteristics, and/or elements described in connection with other embodiments unless specifically indicated otherwise. Accordingly, it will be understood by those of skill in the art that various changes in form and details may be made without departing from the spirit and scope of the present invention as set forth in the following claims.

What is claimed is:

1. An external battery, comprising:
    a battery;
    a charging circuit configured to i) receive external power from an external charger, ii) generate a charging current based at least in part on the received external power, and iii) provide the charging current to the battery or an external device that is external to the external battery;
    a detector configured to detect whether the external charger and the external device are both coupled to the external battery, wherein the detector includes i) a first detector configured to measure the voltage of the external power and ii) a second detector configured to measure current applied to the external device; and
    a main controller unit (MCU) configured to, in response to the external charger and the external device both being coupled to the external battery, control the charging circuit to be disconnected from the battery, establish and maintain an electrical connection between the charging circuit and a rechargeable battery of the external device until the rechargeable battery is fully charged with the charging current, wherein the MCU is further configured to, in response to the rechargeable battery being fully charged, disconnect the charging circuit from the rechargeable battery and electrically connect the charging circuit to the battery,
    and wherein the MCU is further configured to i) determine whether the external charger is coupled to the external battery based at least in part on the measured voltage, and ii) recognize that the external device has been coupled to the external battery when the current is at least substantially equal to a predetermined reference current.

2. The external battery of claim 1, wherein the MCU is further configured to control the charging circuit to provide the charging current to the battery when the measured current is less than the reference current.

3. The external battery of claim 2, wherein the MCU is further configured to control the charging circuit to provide the charging current to the external device when i) the measured current is at least substantially equal to the reference current or ii) the measured current is at least substantially equal to the reference current for a predetermined reference period.

4. The external battery of claim 1, further comprising:
    an input unit configured to receive external power from the external charger and provide the received external power to the charging circuit;
    an output unit configured to provide an output current of the battery to the external device;
    a bypass circuit configured to selectively electrically couple the external charger to the external device;
    a first switching circuit placed between the charging circuit and the battery and configured to selectively i) electrically couple or decouple the charging circuit and the battery and ii) electrically couple or decouple the charging circuit and the bypass circuit; and
    a second switching circuit placed between the output unit and the external device and configured to selectively i) electrically couple or decouple the output unit and the external device and ii) electrically couple or decouple the external device and the bypass circuit.

5. The external battery of claim 4, wherein the MCU is further configured to control the first switching circuit to i) decouple the charging circuit from the battery and ii) electrically couple the charging circuit to the bypass circuit, and control the second switching circuit i) to decouple the output unit from the external device and ii) electrically couple the external device to the bypass circuit when the MCU has determined that the external charger and the external device are both coupled to the external battery.

6. The external battery of claim 5 wherein the MCU is further configured to i) control the first switching circuit to electrically couple the charging circuit to the battery and decouple the charging circuit from the bypass circuit, and ii) control the second switching circuit to electrically couple the output unit to the external device and decouple the external device from the bypass circuit when the measured current is less than the predetermined reference current.

7. The external battery of claim 6, wherein the MCU is further configured to control the first and second switching circuits so that i) the charging circuit is electrically coupled to the external device ii) the charging circuit is decoupled from the battery and iii) the output unit is decoupled from the external device when the measured current is i) at least substantially equal to the predetermined current or ii) at least substantially equal to the predetermined current for a predetermined reference period.

8. The external battery of claim 4, wherein the first switching circuit is a three-terminal switch configured to selectively electrically connect i) the charging circuit to the battery or ii) the charging circuit to the bypass circuit, and wherein the second switching circuit is a three-terminal switch configured to selectively electrically connect i) the output unit to the external device or ii) the external device to the bypass circuit.

9. The external battery of claim 8, wherein each of the first and second switching circuits comprises at least one of: a solenoid switch, a trip coil or an insulated gate bipolar transistor (IGBT).

10. The external battery of claim 1, wherein the MCU is further configured to i) control the charging circuit to provide the charging current to the external device when the magnitude of the charging current is at least substantially equal to a predetermined reference charging current, and ii) control the charging circuit to provide the charging current to the battery when the magnitude of the charging current is less than the predetermined reference charging current.

11. The external battery of claim 10, wherein the magnitude of the predetermined reference charging current is about 2 Amperes.

12. A method of driving an external battery, comprising:
    determining whether an external charger and an external device are both coupled to the external battery, and the determining includes:

measuring the voltage of external power;

measuring current applied from the external battery to the external device determining whether the external charger is coupled to the external battery based at least in part on the measured voltage; and determining that the external device has been coupled to the external battery when the measured current is at least substantially equal to a predetermined reference current;

generating a charging current at a charging circuit based at least in part on the external power received from an external charger; and in response to the external charger and the external device both being coupled to the external battery, controlling the charging circuit to be disconnected from a battery of the external battery, establishing and maintaining an electrical connection between the charging circuit and a rechargeable battery of the external device until the rechargeable battery is fully charged with the charging current; and in response to the rechargeable battery being fully charged, disconnecting the charging circuit from the rechargeable battery, and electrically connecting the charging circuit to the battery.

13. The method of claim 12 further comprising:

determining that a battery built in the external device has been fully charged when the measured current is less than the predetermined reference current, and controlling the charging current to be provided to the battery built in the external battery.

14. The method of claim 13, further comprising:

determining that the external device has attempted to recharge when i) the measured current is at least substantially equal to the predetermined reference current or ii) the measured current is at least substantially equal to the predetermined reference current for a predetermined reference period, and providing the charging current to the external device after the external device has attempted to recharge.

15. An external battery, comprising:

a battery;

a detector configured to detected whether an external charger and an external device are both connected to the external battery, wherein the detector comprises i) a first detector configured to measure the voltage of external power, and ii) a second detector configured to measure current applied to the external device; and a charging circuit configured to i) receive external power from the external charger and ii) generate a charging current based at least in part on the received external power, wherein the charging circuit is further configured to, in response to the external charger and the external device both being coupled to the external battery, be disconnected from the battery, establish and maintain an electrical connection with a rechargeable battery of the external device until the rechargeable battery is fully charged with the charging current, and wherein the charging circuit is further configured to, in response to the rechargeable battery being fully charged, be disconnected from the rechargeable battery, and electrically connect to the battery, wherein the detector further comprises a controller configured to control the charging circuit to selectively provide the charging current to the external device or the battery based at least in part on the measured voltage and the measured current.

16. The external battery of claim 15, wherein the detector is further configured to detect whether the external device is fully charged and wherein the charger is further configured to provide the charging current to the battery when the external device is fully charged.

17. The external battery of claim 15, further comprising a bypass circuit placed between the charger and the external device, wherein the charger is further configured to be selectively electrically connected to the external device through the bypass circuit or the battery.

* * * * *